(12) United States Patent
Ito

(10) Patent No.: US 9,142,006 B2
(45) Date of Patent: Sep. 22, 2015

(54) DATA PROCESSING APPARATUS, DATA PROCESSING METHOD, AND STORAGE MEDIUM FOR STORING IMAGE DATA

(75) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 446 days.

(21) Appl. No.: 13/596,184

(22) Filed: Aug. 28, 2012

(65) Prior Publication Data

US 2013/0077868 A1 Mar. 28, 2013

(30) Foreign Application Priority Data

Sep. 28, 2011 (JP) .................................. 2011-213380

(51) Int. Cl.
*G06F 15/00* (2006.01)
*G06K 1/00* (2006.01)
*G06K 15/00* (2006.01)
*G06T 1/60* (2006.01)

(52) U.S. Cl.
CPC ........................................ *G06T 1/60* (2013.01)

(58) Field of Classification Search
CPC ........ G06T 1/60; G06F 15/02; H04N 1/4051; H04N 1/02; H04N 1/4053
USPC .......................................... 358/1.16, 1.9, 1.1
See application file for complete search history.

(56) References Cited

U.S. PATENT DOCUMENTS 8,417,032 B2 * 4/2013 Mizuno et al. ................ 382/168
8,570,609 B2 * 10/2013 Ashikaga ...................... 358/452

FOREIGN PATENT DOCUMENTS

| JP | 2002-051210 A | 2/2002 |
| JP | 2006-139606 A | 6/2006 |
| JP | 2009-098692 A | 5/2009 |
| JP | 2010-087804 A | 4/2010 |
| JP | 2010-272028 A | 12/2010 |

OTHER PUBLICATIONS

Japanese Office Action issued in corresponding application No. 2011-213380 on Jun. 22, 2015.

* cited by examiner

*Primary Examiner* — Douglas Tran
(74) *Attorney, Agent, or Firm* — Carter, DeLuca, Farrell & Schmidt, LLP

(57) ABSTRACT

A data processing apparatus obtains an input pixel region contained in image data, inputs a pixel value contained in the input pixel region into an image processor, obtains the image-processed pixel value from the image processor, and outputs an output pixel region. Data of the input pixel region and data of the output pixel region are temporarily stored, and the size of an input area that stores the data of the input pixel region and the size of an output area that stores the data of the output pixel region are set based on the number of pixels in the input pixel region and the number of pixels in the output pixel region.

17 Claims, 13 Drawing Sheets

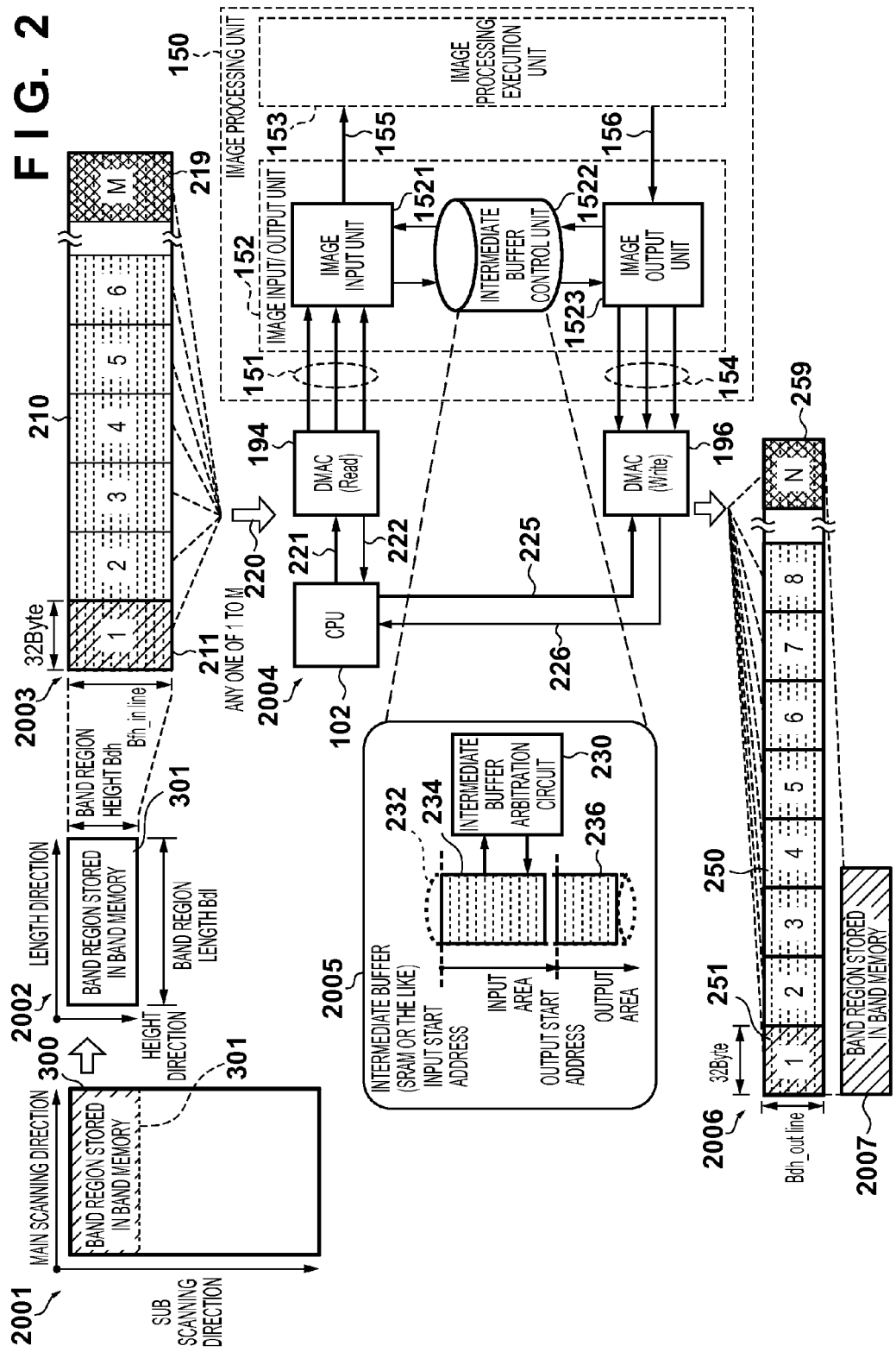

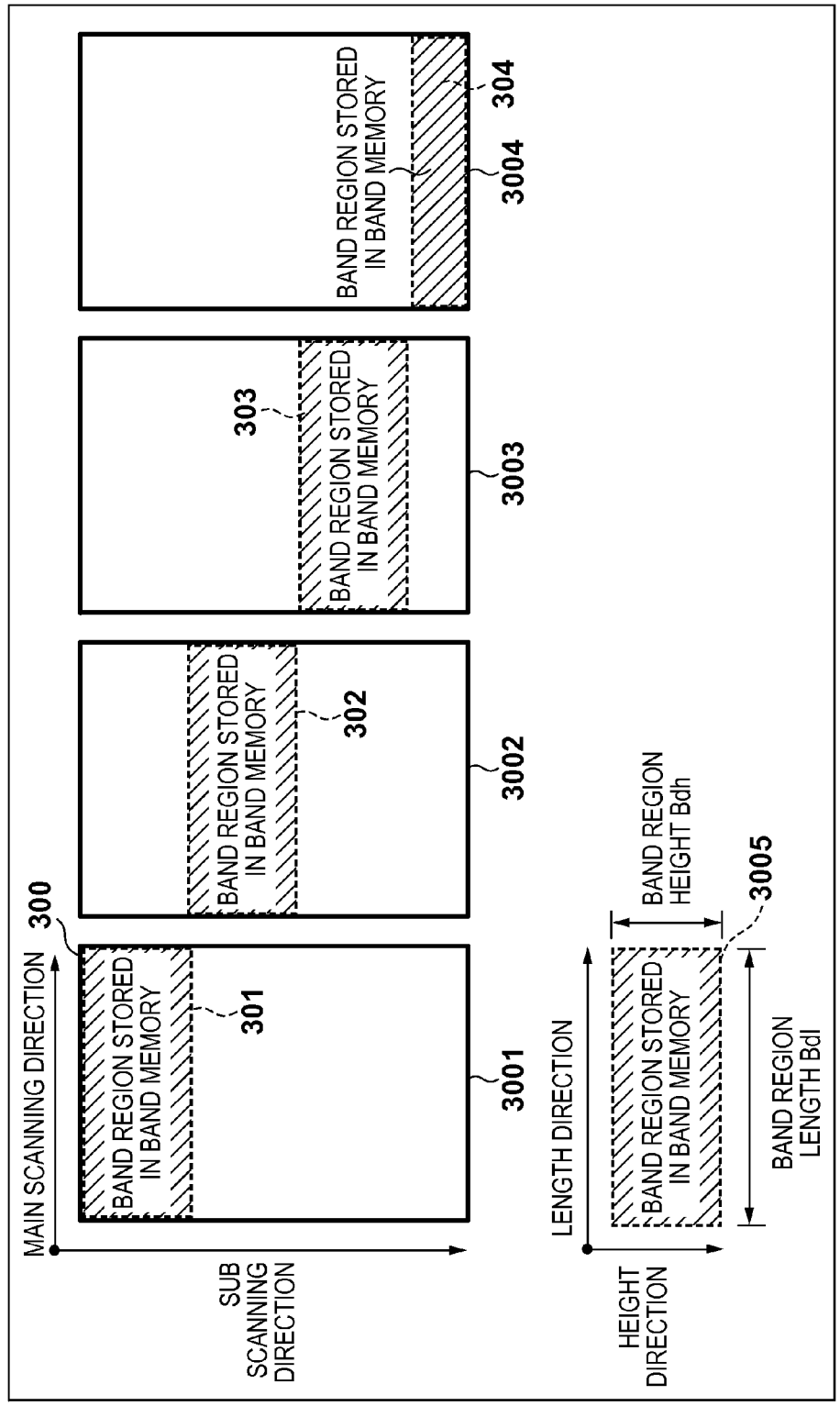

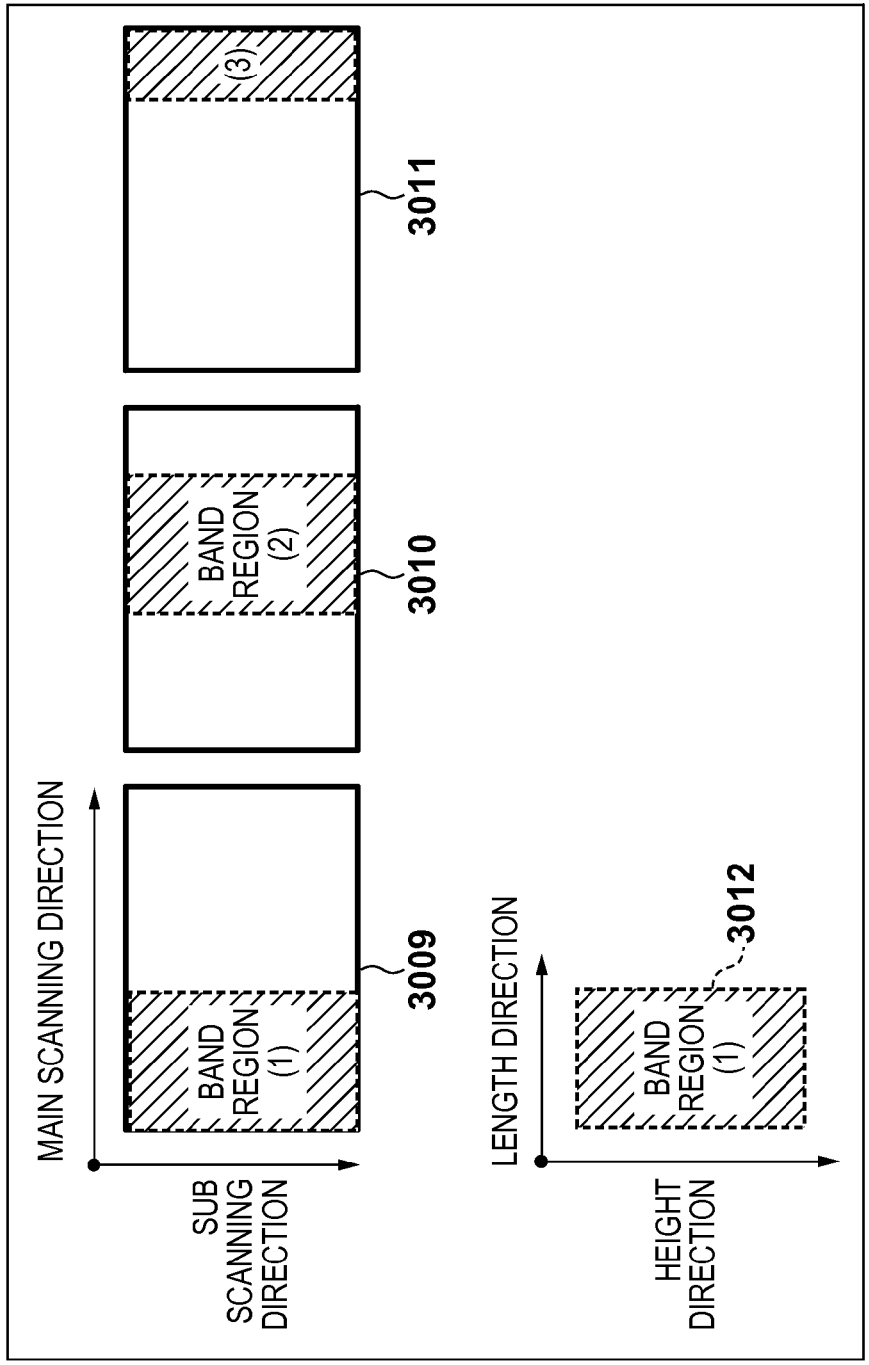

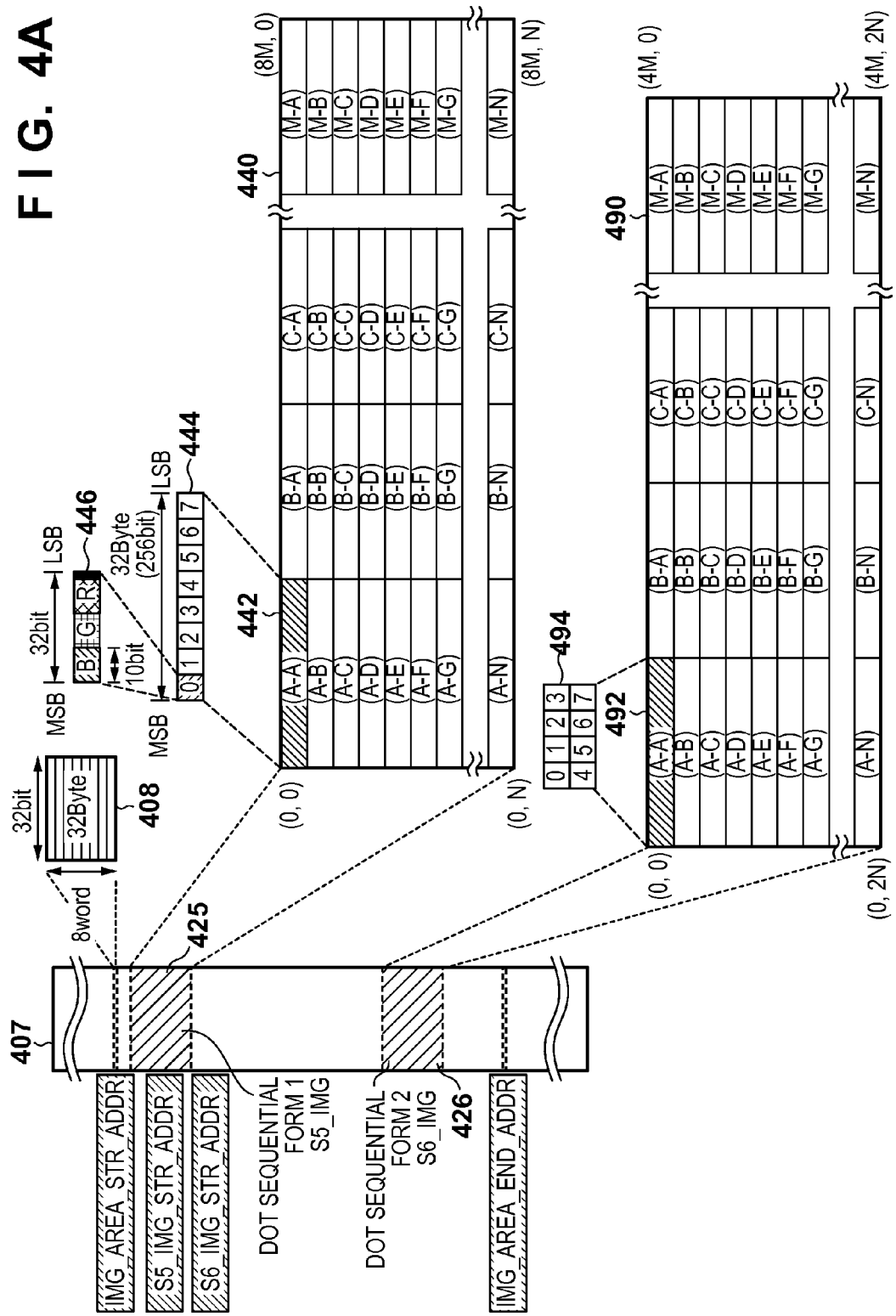

DATA PROCESSING APPARATUS, DATA PROCESSING METHOD, AND STORAGE MEDIUM FOR STORING IMAGE DATA

BACKGROUND OF THE INVENTION

1. Field of the Invention

The present invention relates to a data processing apparatus, a data processing method and a storage medium for temporarily storing image data before and after image processing.

2. Description of the Related Art

Conventionally, local (neighborhood) image processing such as spatial filtering is performed when forming an image and outputting the formed image. In the local image processing, a predetermined calculation is performed on a spatial filtering region including pixels to be processed (hereinafter simply referred to as "processing pixels") by using all or most of the pixels in the spatial filtering region.

Resolution conversion is one type of local (neighborhood) image processing, in which an input image is converted to an image of desired size by enlarging or reducing the input image. In the resolution conversion, naturally, the number of input pixels and the number of output pixels after processing are significantly different. Accordingly, it is difficult to implement an apparatus for resolution conversion as compared to an apparatus for common local (neighborhood) image processing. For example, in Japanese Patent Laid-Open No. 2010-087804, it is pointed out that in a case where a plurality of combinations of delay memory and spatial filtering are used, if resolution conversion is executed between each combination, two delay memories before and after the processing cannot be used effectively.

To address this problem, Japanese Patent Laid-Open No. 2010-087804 discloses resolution conversion processing called "main scanning scaling" in which the number of pixels in the main scanning direction of an input image is changed by size enlargement or reduction. According to the technique disclosed in Japanese Patent Laid-Open No. 2010-087804, two spatial filters before and after resolution conversion perform calculation on the processing pixels in a two-dimensional region, and thus it is necessary to provide a delay memory for each of the two spatial filters. Also, Japanese Patent Laid-Open No. 2010-087804 focuses on the two delay memories and changes in the number of pixels, and discloses a technique for making effective use of the memories. Also, Japanese Patent Laid-Open No. 2010-087804 uses block (tile) processing in which an image is two dimensionally divided into regions in both the main scanning direction and the sub scanning direction, and image processing is performed sequentially on pixel regions obtained as a result of the division.

Meanwhile, Japanese Patent Laid-Open No. 2006-139606 discloses a band processing technique that is similar to the block (tile) processing described above. With the band processing, an image is one-dimensionally divided into regions only in the main scanning direction, and pixel regions obtained as a result of division is sequentially subjected to image processing. With this technique, in order to perform local (neighborhood) image processing on the band regions without a break, the band regions are configured such that adjacent band regions partially overlap each other at their boundaries. Also, according to Japanese Patent Laid-Open No. 2006-139606, pixels are scanned on a pixel by pixel basis in the same direction as the height of each band region, and thereby the capacities of the delay memories for holding processing pixels required for local (neighborhood) image processing are defined by the magnitude of the height of each band region. In this way, Japanese Patent Laid-Open No. 2006-139606 implements reduction of the capacities of the delay memories.

As with the block (tile) processing disclosed in Japanese Patent Laid-Open No. 2010-087804, the band processing disclosed in Japanese Patent Laid-Open No. 2006-139606 is also a technique in which an image is divided into regions and image processing is performed sequentially or in a distributed concurrent manner. Hereinafter, such techniques will be collectively referred to as "region division techniques". Image processing that is incompatible with such region division techniques is not only the resolution conversion disclosed in Japanese Patent Laid-Open No. 2010-087804.

For example, trimming processing, edge extension processing and the like that are used in printer image processing or the like are also incompatible with the region division techniques. Trimming processing is processing for partial removal of an image, and the number of pixels of an output image is reduced as compared to the number of pixels of an input image. Likewise, edge extension is processing performed only on the pixels on the edge of an image, in which only a predetermined number of pixels are copied and extended or the pixels of a specific color are extended, and the number of pixels of an output image is increased as compared to the number of pixels of an input image.

IP conversion and the like that are used in video processing or the like are also incompatible with the region division techniques. IP conversion is processing in which interlace images whose pixels have been thinned out in the sub scanning direction are combined into a progressive image in which the pixels of one frame are not thinned out by using a plurality of frames in the time axis direction. For example, in the case where a progressive image of a single image is obtained by combining interlace images of two frames, the total number of pixels of an input image is the same as the number of pixels of an output image. However, with high quality IP conversion, a progressive image of a single frame is obtained by combining interlace images of 3 to 5 frames, and thus the number of pixels of an output image is reduced as compared to that of an input image. In the example of IP conversion, the relationship between the number of pixels of an input image and the number of pixels of an output image varies depending on the operation mode (image quality mode) selected by the user.

Recently available image processing apparatuses incorporate many various image processing tasks including the above described spatial filtering, resolution conversion, trimming processing, edge extension processing and IP conversion. In order to achieve the desired image quality with each apparatus, the image processing apparatus often selects processing from among the various processing tasks according to the application and uses the selected processing tasks in combination.

However, additional attention is required in the case where a combination of a plurality of processing tasks is implemented with a region division technique. In the case where calculation is performed using processing pixels of a two-dimensional region such as spatial filtering, it is necessary to accumulate surrounding pixels according to the pixel size handled by the filtering and process the image. If spatial filtering is performed a plurality of times, it is necessary to accumulate surrounding pixels each time and process a larger image in which all of the surrounding pixels have been accumulated.

Furthermore, with spatial filtering such as chroma upsampling in video processing, only accumulating surrounding pixels as described above is insufficient. With such spatial filtering, it is necessary to give consideration to the phase of input processing pixels on an image. Accordingly, there is a special limitation that restricts the numbers of pixels in the vertical and horizontal directions of the image input for the spatial filtering to multiples of 4.

In order to perform the desired image processing while satisfying the limitations of a plurality of processing tasks selected and combined according to the application, it is not possible to easily define the relationship between the number of pixels of the input image and the number of pixels of the output image. The application is designed to process an image having a number of pixels that is greater than that of an image obtained as a result of accumulation of surrounding pixels in spatial filtering performed a plurality of times. In some cases, the application is required to remove a part of the processed image at the end of processing so as to adjust the image to the desired size.

When using the region division technique, it is important to consider how to implement the image processing method that selects and combines a plurality of image processing tasks by using hardware.

Generally, an image processing apparatus that uses hardware implements the simultaneous operation of various components and the cooperative operation of the components by transferring images to and from an external storage device via an input local buffer and an output local buffer. However, as described above, when performing image processing by selecting and combining a plurality of processing tasks, the number of pixels of input image and the number of pixels of output image cannot be easily defined. Accordingly, it is difficult to appropriately define the capacity of the input local buffer and the capacity of the output local buffer, and a problem arises such as reduction of utilization efficiency caused by preparing excessively large buffers or delay of processing by preparing excessively small storage capacity.

Japanese Patent Laid-Open No. 2010-087804 focuses on two (pre-filter and post-filter) delay memories before and after main scanning scaling. However, Japanese Patent Laid-Open No. 2010-087804 does not give consideration to an image processing apparatus as a hardware configuration for implementing an image processing method for selecting and combining a plurality of various image processing tasks. Accordingly, Japanese Patent Laid-Open No. 2010-087804 contains no disclosure of a useful solution for a method that copes with the above-described situation in which the number of pixels of the input image and the number of pixels of the output image vary. Also, Japanese Patent Laid-Open No. 2010-087804 contains no disclosure of a useful solution that focuses on the input local buffer that is required to read images from an external storage device and the output local buffer that is required to write processed images into the external storage device.

The present invention has been made in view of the above problems and provides a technique that enables efficient utilization of a storage device that temporarily stores an input image and an output image under the conditions in which the number of input pixels and the number of output pixels vary due to image processing in which various processing tasks are combined.

SUMMARY OF THE INVENTION

According to one aspect of the present invention, there is provided a data processing apparatus that obtains a pixel value of a pixel contained in an input pixel region of image data, inputs the pixel value to an image processor, obtains an image-processed pixel value from the image processor and outputs the image-processed pixel value as a pixel value of a pixel in an output pixel region, the data processing apparatus comprising: a storage unit configured to temporarily store data of the input pixel region and data of the output pixel region; and a setting unit configured to set a size of an input area in the storage unit that stores the data of the input pixel region and a size of an output area in the storage unit that stores the data of the output pixel region based on the number of pixels in the input pixel region and the number of pixels in the output pixel region.

According to one aspect of the present invention, there is provided a data processing apparatus that processes a partial image obtained by dividing an input image held by a first storage unit into a plurality of strip-shaped regions in a first direction, the data processing apparatus comprising: an image processor configured to carry out image processing in units of the partial image; a second storage unit configured to store an input partial image that is input into the image processor in a first area and store an output partial image obtained as a result of the input partial image being subjected to image processing by the image processor in a second area; and a setting unit configured to set a size of the first area and a size of the second area of the second storage unit based on a first number of pixels in the first direction of the input partial image and a second number of pixels in the first direction of the output partial image.

According to one aspect of the present invention, there is provided a data processing method for a data processing apparatus that obtains a pixel value of a pixel contained in an input pixel region of image data, inputs the pixel value to an image processor, obtains an image-processed pixel value from the image processor and outputs the image-processed pixel value as a pixel value of a pixel in an output pixel region, and that has a storage unit configured to temporarily store data of the input pixel region and data of the output pixel region, the method comprising: with a setting unit, setting a size of an input area in the storage unit that stores data of the input pixel region and a size of an output area in the storage unit that stores data of the output pixel region based on the number of pixels in the input pixel region and the number of pixels in the output pixel region.

According to one aspect of the present invention, there is provided a computer readable storage medium storing a program for causing a computer to function as the following units of a data processing apparatus that obtains a pixel value of a pixel contained in an input pixel region of image data, inputs the pixel value to an image processor, obtains an image-processed pixel value from the image processor and outputs the image-processed pixel value as a pixel value of a pixel in an output pixel region, the units including: a storage unit configured to temporarily store data of the input pixel region and data of the output pixel region; and a setting unit configured to set a size of an input area in the storage unit that stores data of the input pixel region and a size of an output area in the storage unit that stores data of the output pixel region based on the number of pixels in the input pixel region and the number of pixels in the output pixel region.

Further features of the present invention will be apparent from the following description of exemplary embodiments with reference to the attached drawings.

BRIEF DESCRIPTION OF THE DRAWINGS

FIG. 2 shows an example of an operation related to input and output of image data.

FIGS. 3A, 3B and 3C illustrate an example of an operation of band processing.

FIGS. 4A and 4B show an image data storage method, and examples of data structures.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Hereinafter, an embodiment of the present invention will be described in detail with reference to the accompanying drawings.

Image Processing Apparatus

Figure 1A:
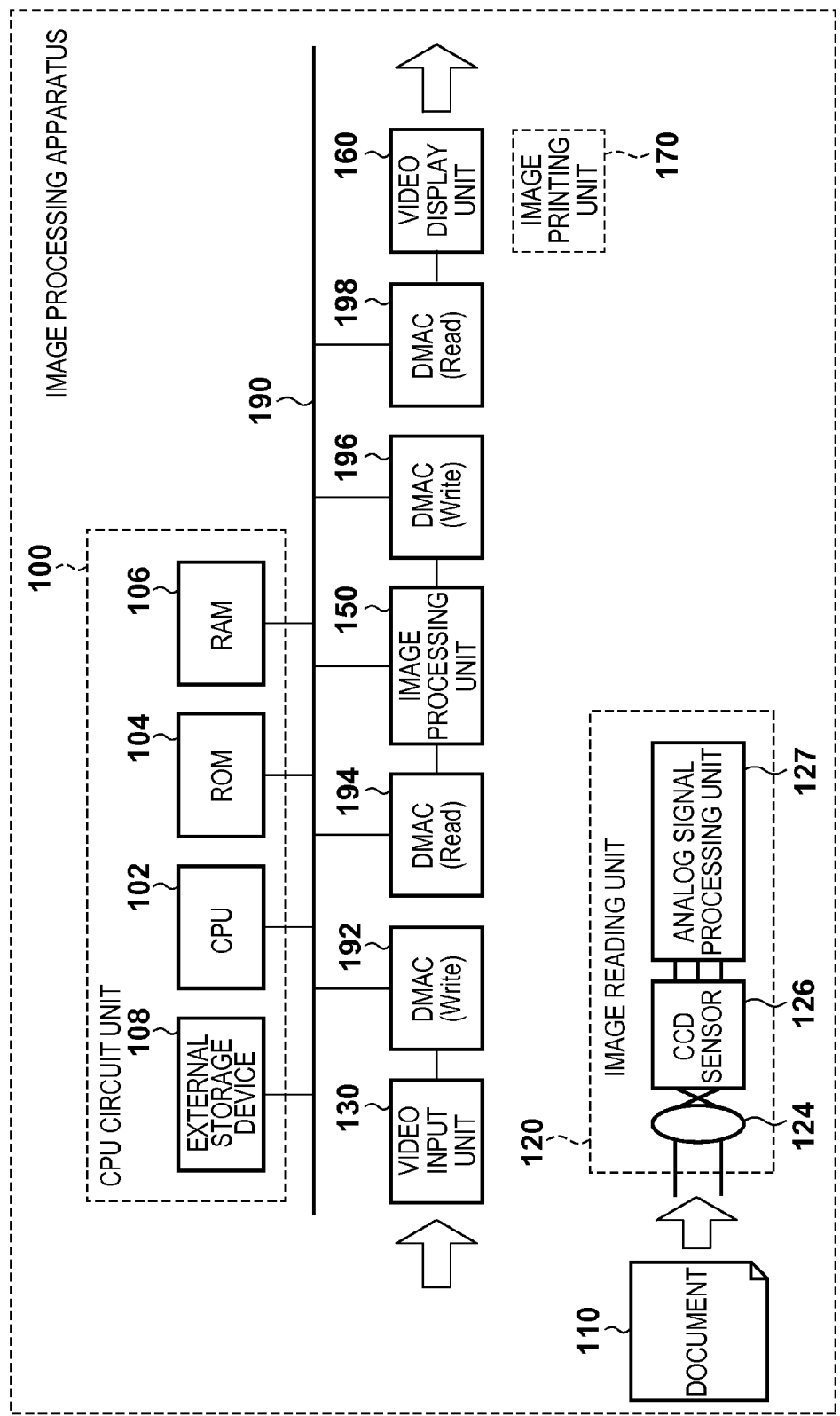
FIGS. 1A and 1B show an overall configuration of an image processing apparatus and an example of a configuration of an image processing unit.

FIG. 1A is a block diagram showing an example of an overall configuration of an image processing apparatus according to the present invention. The image processing apparatus includes, for example, a CPU circuit unit 100, an image reading unit 120 and an image processing unit 150.

The image reading unit 120 includes a lens 124, a CCD sensor 126, an analog signal processing unit 127 and so on. In the image reading unit 120, image information of an original document 110 is imaged on the CCD sensor 126 via the lens 124, and the image information is converted to R (red), G (green) and B (blue) analog electric signals by the CCD sensor 126. The image information converted to analog electric signals is input into the analog signal processing unit 127, subjected to correction and the like for each of R, G and B colors, and thereafter subjected to analog/digital conversion (A/D conversion). In this way, a full-color digital image signal (pixel value) that has been digitized is generated. The generated digital image signal is input into a video input unit 130, and thereafter input into a DMAC (direct memory access controller) 192.

The operation of the DMAC 192 has been preset by a CPU 102, and the DMAC 192 stores the input digital image signal in a RAM 106 provided in the CPU circuit unit 100 via a shared bus 190. Hereinafter, the data obtained by collecting the digital image signals of a plurality of pixels so as to form a single image will be referred to as "image data". In the following description, it is assumed that the digital image signal is stored in the RAM 106 in the form of image data. To perform image processing, the CPU 102 activates a DMAC 194 to read the image data stored in the RAM 106 and input the digital image signal of a pixel to be processed into the image processing unit 150.

The image processing unit 150 is a data processing apparatus that generates image data by performing, for example, on the input digital image signal, color correction, namely for example, correction between individual reading elements of sensor devices such as scanners and input gamma correction. Then, a DMAC 196 stores the data that has undergone the above processing in the RAM 106. With respect to control of the DMAC 196, for example, the CPU 102 presets the operation of the DMAC 196, and the CPU 102 activates the DMAC 196. The operation of the DMAC 196 is set such that, for example, the DMAC 196 writes the processed image data into the RAM 106.

The image processing unit 150 thereby performs, for example, image processing for printing an image on the input digital image signal, such as input color correction processing, spatial filtering, color space conversion, density correction processing and halftone processing. Then, the image processing unit 150 generates printable image data, and the image data is stored in the RAM 106 by the DMAC 196.

A DMAC 198 reads image-processed image data stored in the RAM 106 and outputs the data to an image printing unit 170. The image printing unit 170 is a printer, for example. The setting of the DMAC 198 is performed by, for example, the CPU 102. The image printing unit 170 is provided with, for example, a print output unit (not shown) such as a raster plotter that uses an inkjet head or a thermal head. Then, an image is recorded on paper based on the digital image signals of the input image data. The foregoing described an example in which the image printing unit 170 is used, but the present invention is not limited thereto. It is also possible to use a configuration in which, for example, desired image (video) processing is performed on an input video by using the video input unit 130, a video display unit 160 and the like, and then the processed video is displayed on a display device (not shown) such as a display.

The CPU circuit unit 100 includes the CPU 102 for calculation control, a ROM 104 for storing fixed data and programs, the RAM 106 used to temporarily store data and load programs, an external storage device 108, and so on. The CPU circuit unit 100 controls the image reading unit 120, the image processing unit 150, and the image printing unit 170 and the like, as well as performing overall control of a sequence of the image processing apparatus, which will be described later. The external storage device 108 is a storage medium, such as a disk, that stores parameters, programs and correction data used by the image processing apparatus of the present embodiment. It may be possible to use a configuration in which the data, programs and the like in the RAM 106 are loaded from the external storage device 108.

Image Processing Unit

Figure 1B:
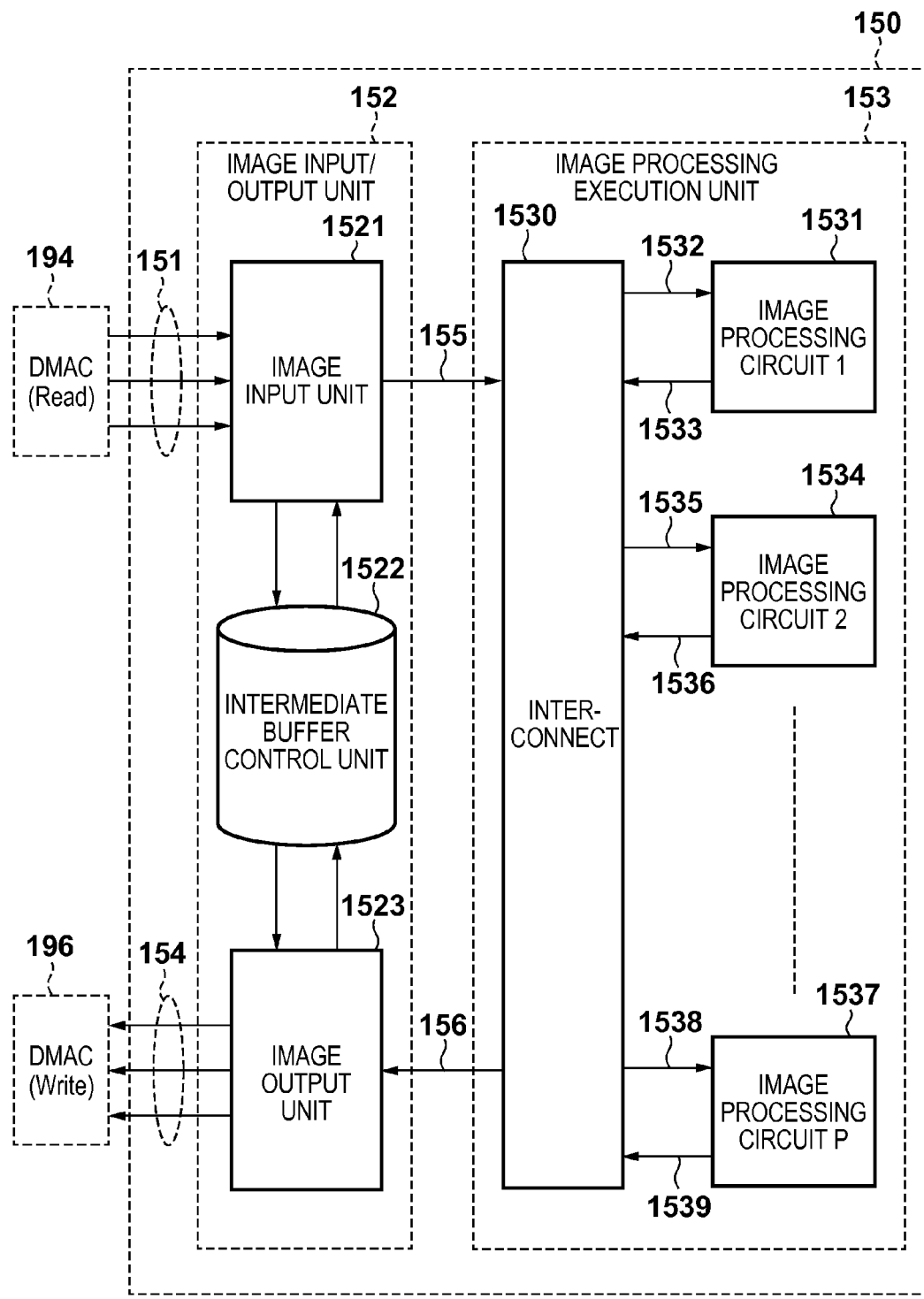

Next, the image processing unit 150 that performs image processing on image data will be described in detail with reference to FIG. 1B. The CPU 102 activates the DMAC 194, and the DMAC 194 reads image data from the RAM 106. The data structure of the image data will be described later. The read image data is input into an image input/output unit 152 of the image processing unit 150 via an input port 151. In the image input/output unit 152, upon obtaining image data, an image input unit 1521 stores the obtained image data in a storage unit (intermediate buffer), which will be described later, included in an intermediate buffer control unit 1522. The image input unit 1521 generates a pixel value while reading the image data temporarily stored in the intermediate buffer, and inputs the pixel value into an image processing execution unit 153 as an input pixel value 155.

The image processing execution unit 153 executes predetermined image processing on the input pixel value 155, and outputs an output pixel value 156 to the image input/output unit 152. The image processing execution unit 153 will be described later in detail. Here, the input pixel value 155 and the output pixel value 156 each include one or more pixel values. For example, when a plurality of pixel values are input as input pixel values 155, one pixel value is output as an output pixel value 156.

In the image input/output unit 152, an image output unit 1523 generates output image data from the processed output pixel value 156, and stores the generated data in the storage (intermediate buffer) provided in the intermediate buffer control unit 1522. The image output unit 1523 reads the processed image data temporarily stored in the storage (intermediate buffer) and sends out the read data to the DMAC 196 via an output port 154 as output image data. As described above, the DMAC 196 has already been activated by the CPU 102, and writes the received output image data into the RAM 106.

In other words, the image processing unit 150 obtains image data from the DMAC 194 via the image input/output unit 152, executes data processing on the image at the image processing execution unit 153, and outputs the data-processed image data to the DMAC 196 via the image input/output unit 152. In this way, the image processing unit 150 functions to perform data processing on image data contained in the image processing apparatus and return the data-processed image data to the image processing apparatus. The image input/output unit 152 functions as a data input/output control device that adjusts data input and output.

Image Processing Execution Unit

Next, the image processing execution unit 153 included in the image processing unit 150 will be described in detail. The image processing execution unit 153 is constituted by P image processing circuits from an image processing circuit 1 (1531) to an image processing circuit P (1537) and an interconnect 1530. The P image processing circuits and the interconnect 1530 are connected to each other via ports such as input ports 1532, 1535 and 1538 and output ports 1533, 1536 and 1539.

The image processing circuits perform one of, for example, input color correction processing, color space conversion, density correction processing, halftone processing, spatial filtering, resolution conversion, trimming processing, edge extension processing, IP conversion and chroma upsampling. These image processing circuits may be implemented with hardware such as pipeline circuits, or may be implemented with a processor and a program (software). The image processing circuits receive, for example, input pixel values 155 from the input ports 1532, 1535 and 1538, perform processing on the input pixel values, and then output processed output pixel values 156 from the output ports 1533, 1536 and 1539.

The interconnect 1530 is implemented with a connecting device such as a cross bar, a ring bus or the like, and is capable of voluntarily switching between input port connection destination and output port connection destination. Accordingly, by the CPU 102 setting designation of the connection destinations of these ports, the interconnect 1530 can, for example, change the order in which the P image processing circuits are executed, or bypass a part of processing. In this way, the image processing execution unit 153 selects and combines various processing tasks according to the application, and implements the desired image processing.

Region Division

A method for dividing image data into regions will be described next. In the following description, band processing which is one of the region division techniques is used. Hereinafter, band processing will be described with reference to FIGS. 3A, 3B and 3C. As indicated by 3001 to 3004 in FIG. 3A, in band processing, image data 300 corresponding to a single page is divided into strip-shaped band regions 301 to 304, and various image processing tasks are sequentially performed on each region. The band regions are obtained by dividing the image data in either the main scanning direction or the sub scanning direction, and the length of the band regions and the length of the image data match in either the main scanning direction or the sub scanning direction. Taking 3001 to 3004 of FIG. 3A as an example, the image data is divided in the sub scanning direction, and thus the image data and the band regions have the same length in the main scanning direction but have different lengths in the sub scanning direction. Hereinafter, the long and narrow regions obtained as a result of the division will be referred to as "band regions", a storage area into which the band regions are expanded will be referred to as a "band memory", and the operation of dividing image data will be referred to as "band division". The band memory may be allocated as a storage area in the RAM 106, or may be allocated in an appropriate storage area on the system. In order to simplify the description, an example will be described in which the band memory is allocated in the RAM 106.

Also, in the following description, as indicated by 3005 in FIG. 3A, the coordinate system (main scanning direction–sub scanning direction) of image data is defined as a new coordinate system (band region coordinate system) with a length direction and a height direction, and each band region is expressed by length×height. The length of the band region, or in other words, the size of the lengthwise side of the band region is either the value of the length in the main scanning direction of the image data or the value of the length in the sub scanning direction of the image data. Also, the height of the band region, or in other words, the size of the heightwise side of the band region can be any value. For example, in 3001 to 3004 of FIG. 3A, the length direction is the main scanning direction, and the height direction is the sub scanning direction. However, in the case where, for example, the image data is divided in the main scanning direction as indicated by 3009 to 3011 in FIG. 3C, the length direction is the sub scanning direction, and the height direction is the main scanning direction as indicated by 3012 in FIG. 3C. The band division as indicated by 3009 to 3011 in FIG. 3C may be performed in the case where, for example, the size in the main scanning direction of image data is larger than the size in the sub scanning direction.

With band processing, first, the first band region 301 shown in 3001 of FIG. 3A is expanded into a band memory in the RAM 106 and subjected to image processing. Next, the second band region 302 shown in 3002 of FIG. 3A is written over and expanded into the band memory of the RAM 106 into which the first band region 301 has been expanded, and then subjected to image processing. After that, the third band region 303 shown in 3003 of FIG. 3A is written over and expanded into the band memory of the RAM 106 into which the second band region 302 has been expanded, and then subjected to image processing. Finally, the fourth band region 304 shown in 3004 of FIG. 3A is written over and expanded into the band memory of the RAM 106 into which the third band region 303 has been expanded, and then subjected to image processing. As can be seen from 3001 to 3004 of FIG. 3A, the band regions 301 to 304 have the same length, but the height is not necessarily the same. Accordingly, the height of the band memory that is the storage area allocated in the main memory is determined by the band region having the longest heightwise side (the first to third band regions 301 to 303 in the case of FIG. 3A).

Figure 3B:
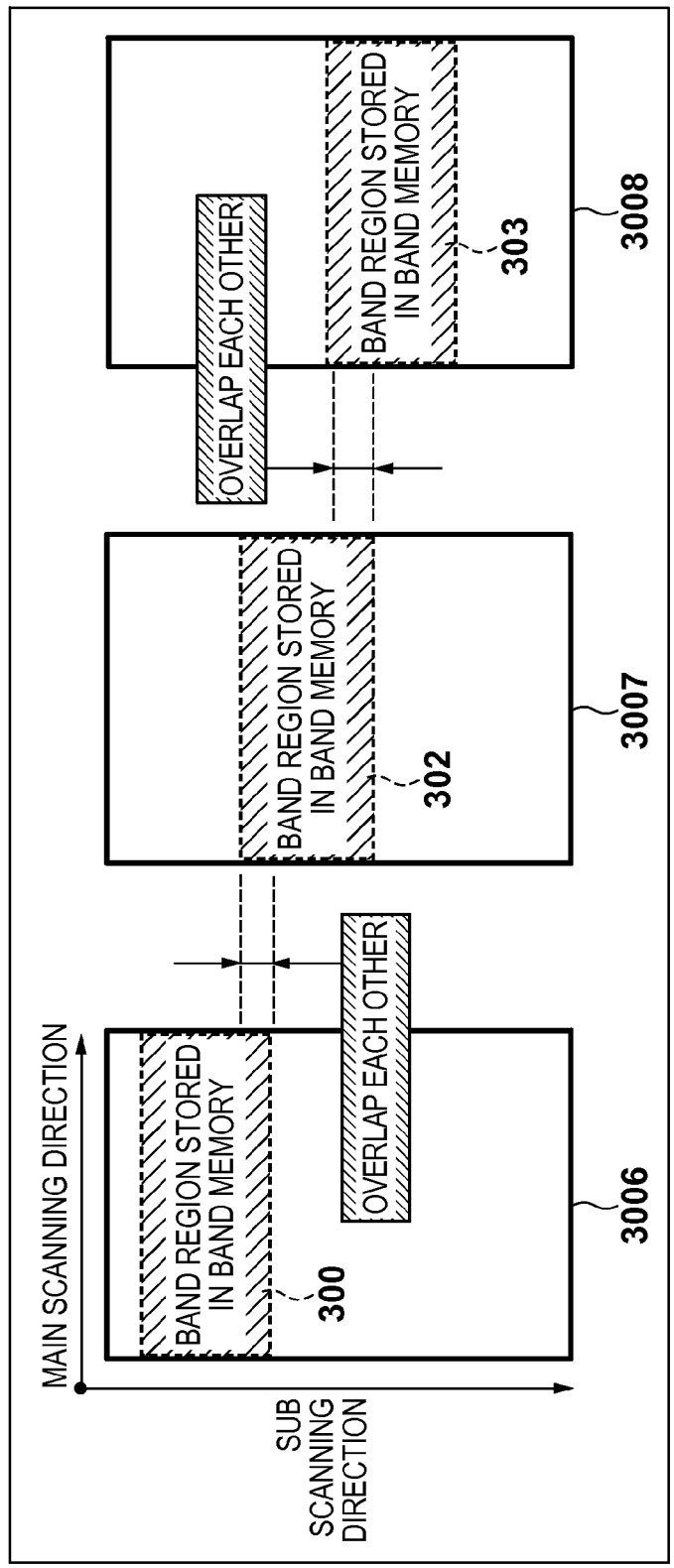

With band processing, in order to perform local (neighborhood) image processing, such as spatial filtering, on the band regions without a break, the band regions are configured such that adjacent band regions partially overlap each other at their boundaries, as indicated by 3006 to 3008 in FIG. 3B.

Data Structure of Image Data

An example of the data structure of image data will be described in detail. As described above, image data is temporarily stored in the RAM 106. Generally, the RAM 106 is often configured with an inexpensive DRAM. Accordingly, in the case where image data is read or written via a DMAC as described above, the image data may be handled in units for which data can be read and written without reduction of the performance of the DRAM. Here, an example of a method for storing image data in the RAM 106 and an example of the data structure of image data will be described in detail with reference to FIG. 4A. FIG. 4A shows a state in which data is stored in the RAM 106 (DRAM). In the example shown in FIG. 4A, a certain number of data areas (areas from IMG_AREA_STR_ADDR to IMG_AREA_END_ADDR) are allocated, and various types of image data necessary for image processing are stored in the data areas.

FIG. 4A shows an example in which image data of dot sequential form is stored in the RAM 106, and in which two types of image data, namely, S5_IMG 425 and S6_IMG 426 are stored in the data area of the RAM 106 (DRAM). In this example, the minimum unit of the capacity of stored image data is set to 32 bits×8 words=32 bytes as indicated by 408, so that the image data can be read and written without reduction of DRAM performance. In other words, the storage capacity for the image data S5_IMG 425 and S6_IMG 426 is an integer multiple of 32 bytes.

Next, the data structure of image data will be described in detail. Image data 440 is of dot sequential form and has R (red), G (green) and B (blue) pixel values. Each area 442 of the image data 440 is 32-byte unit data, and a plurality of (eight) pixel values are packed in the single area 442, as indicated by 444. In each of the eight pixel values contained in 444, 10-bit R, G and B values are packed as indicated by 446. In this example, the remaining 2 bits are used for invalid data for facilitating access to DRAM, and data is not stored therein. In the diagram, the image data 440 indicated by the thick line has 8M×N pixel size. The foregoing shows an example in which the area 442 is 32-byte unit data having a height of 1 pixel and a width of 8 pixels, but it is also possible to define an area 492 for data having a height of 2 pixels and a width of 4 pixels as indicated by image data 494.

Method for Inputting/Outputting Image Data

FIG. 2 schematically shows a method for inputting/outputting image data from the RAM 106 to the image input/output unit 152 or from the image input/output unit 152 to the RAM 106. The image processing apparatus extracts the band region 301 from the single image data 300 as shown in 2001 and 2002 of FIG. 2, and stores the data in the RAM 106 as input image data. Then, the input image data of this band region has a 32-byte unit data structure as described with reference to FIG. 4A, so that it can be easily handled in the RAM 106. The data structure is indicated by 210 in 2003 of FIG. 2.

In 2004 of FIG. 2, the CPU 102 transmits an instruction signal (indicated by 221 in 2004 of FIG. 2) to the DMAC 194. The DMAC 194 reads the input image data 210 of the band region from the RAM 106 via the shared bus 190 shown in FIG. 1A, and inputs the data into the image processing unit 150. The input image data 210 is divided according to the data structure described above into M small pixel regions (small regions) from a region 1 (211) to a region M (219) each having a processing unit of 32 Byte×Bdh_in. Then, the DMAC 194 reads the input image data of the M small regions (processing units) one by one in order from the small region 1 (211) to the small region M (219), and inputs the read data into the image processing unit 150. The image processing unit 150 receives the input image data of each small region (processing unit) and executes image processing on the small region. Depending on the size of processing unit, each small region, which is a part of the band, may be read as shown in 2004 of FIG. 2, or all pixel regions of the band may be read at one time.

The instruction signal of the CPU 102 that is transmitted to the DMAC 194 contains, for example, "top address of read destination", "continuous read amount (how many times 32-byte unit data is continuously read)", "increment address" and "number of repetitions". The following shows an example of image data of the dot sequential form shown in FIG. 4A.

Top address: S5_IMG_STR_ADDR
Continuous read amount: once (32 bytes)
Increment address: the amount of one line's worth of data=32 bytes×M
Number of repetitions: band region height=Bdh_in times With this setting, 32-byte data is first read from the top address S5_IMG_STR_ADDR. Then, in order to obtain the next data, the address is incremented by 32 bytes×M, whereby reading of the data of the first lines of the small regions 2 to M is skipped, and the 32-byte data of the second line of the small region 1 (211) is read. Then, when the number of repetitions Bdh_in is reached, or in other words, when Bdh_in lines' worth of data of the small region 1 (211) are read, all of the data of the small region 1 (211) can be read. In reading of the input image data of the small regions 2 to M, the DMAC 194 is operated by sequentially shifting "top address" by 32 bytes. In this way, the image processing apparatus reads the input image data of the desired small regions from the RAM 106 by means of DMA transfer.

The image input unit 1521 of the image input/output unit 152 receives input image data from the DMAC 194 and at the same time transfers the data to the intermediate buffer control unit 1522. The intermediate buffer control unit 1522 is constituted by an intermediate buffer arbitration circuit 230 and an intermediate buffer 232 as shown in 2005 of FIG. 2. The intermediate buffer 232 is constituted by an input area 234 that is an area for storing input image data and an output area 236 that is an area for storing output image data, which will be described later. The CPU 102 presets the top address of the input area of the intermediate buffer 232 as an input area top address and the top address of the output area as an output area top address. Note that the input image data input from the image input unit 1521 is first input into the intermediate buffer arbitration circuit 230.

The intermediate buffer arbitration circuit 230 temporarily stores the received input image data in the input area 234 of the intermediate buffer 232. Usually, the intermediate buffer 232 is implemented with a storage device such as a SRAM. For example, in the case where the bit length per word of the storage device is 256 bits (32 bytes), the number of words that need to be stored in the input area 234 corresponds to the band region height, that is, Bdh_in words, which is the number of repetitions of DMA transfer. Also, in the case where the bit length per word of the storage device is 64 bits (8 bytes), 4 words are required to receive data with a length of 32 bytes. Accordingly, the number of words that need to be stored in the input area 234 is the number of words obtained by quadrupling the band region height (the number of repetitions of DMA transfer) Bdh_in. In other words, the capacity of the input area is the capacity in which the input image data of a small region (processing unit), which is the unit transferred in a single instance of DMA transfer, can be stored. When DMA transfer or transfer of the input image data of a single band region has finished, the DMAC 194 may notify the CPU 102 of that fact by using an interrupt signal 222.

After that, the image input unit 1521 reads the temporarily stored input image data of the small region via the intermediate buffer arbitration circuit 230 to sequentially generate a pixel value for each pixel, and inputs the generated pixel value into the image processing execution unit 153. The image input unit 1521 and the image output unit 1523 may be operated asynchronously. It may be possible to, for example, generate an output pixel region 1 (251) by using the input pixel region 1 (211) and a part of the input pixel region 2, and then output the output pixel region 1 (251).

The image processing execution unit 153 performs image processing on the input pixel region composed of one or more pixels. Specifically, for example, with respect to a pixel region composed of a plurality of pixels, multiplication by a predetermined weight coefficient is performed, and all of the resulting values are added up to obtain a single output pixel. Then, this processing is proceeded by, for example, moving one pixel region to the next in the height direction of the band region. When the pixel values for a single row in the height direction have been output, processing for outputting the pixels of the next row is executed. The processed pixel values are output to the image output unit 1523 of the image input/output unit 152 on a pixel-by-pixel basis.

The image output unit 1523 generates output image data from the processed output pixel values, and stores the generated output image data in the output area 236 of the intermediate buffer 232 via the intermediate buffer arbitration circuit 230 on a 32 byte unit basis. The data structure of the generated output image data remains with the dot sequential form shown in FIG. 4A described above, but the configuration of the output image data may be different from that of the input image data, as indicated by 250 of 2006 in FIG. 2. The image processing execution unit 153 executes various image processing tasks in which the input pixel region size and the output pixel region size are different. Accordingly, the number of pixels of the input image data 210 and the number of pixels of the output image data 250 are different. The height of the output band region of the output image data 250 is Bdh_out, and the length of the band region of the output image data 250 is 8×N. In other words, because the input image data 210 and the output image data 250 have different band region heights, and thus the capacities of the small regions (processing units) are different. The band region lengths are also different, and thus the number of small regions (processing units) changes from M to N as well.

However, the data structure is the same for the input image data and the output image data, and therefore the capacity of the output area 236 of the intermediate buffer 232 can be set based on the same principle as the capacity of the input area 234. For example, in the case where the bit length per word of the storage device is 256 bits (32 bytes), the number of words that need to be stored in the output area 236 is Bdh_out words, which is the same as the height of the output band. In the case where the bit length per word of the intermediate buffer 232 is 64 bits (8 bytes), the number of words that need to be stored in the output area 236 is the number of words obtained by quadrupling Bdh_out, which is the output band height.

The image output unit 1523 receives input of, for example, four rows' worth of Bdh_out pixels. When all of the output image data of the small region 1 (251) has been stored in the output area 236 of the intermediate buffer 232, reception of the processed output pixel values 156 from the image processing execution unit 153 is stopped. Then, the output image data of the output area 236 is sequentially read and transmitted to the DMAC 196. The DMAC 196 then writes the processed image data into the RAM 106 in accordance with the instruction signal (225 in 2004 of FIG. 2) transmitted from the CPU 102.

The same operation is repeatedly and sequentially executed on the small regions 2 to N, and all of the output image data of the output band region indicated by 2007 in FIG. 2 is written back into the RAM 106.

As described above, the capacity of the intermediate buffer can be defined by the input band height Bdh_in and the output band height Bdh_out. For example, a fixed intermediate buffer capacity can be divided according to the input band height Bdh_in and the output band height Bdh_out by changing the input area top address and the output area top address. In the above description, the input area and the output area are determined from the input band height and the output band height, but the capacities of the input area and the output area may be determined based on the ratio between the number of input pixels and the number of output pixels in image processing. For example, if data having a Bdh_in of 30 lines is output as data having a Bdh_out of 70 lines as a result of image processing in the image processing execution unit 153, 30% of the intermediate buffer may be assigned as an input area, and the remaining 70% may be assigned as an output area. By doing so, maximum utilization of the intermediate buffer is possible. Also, the number of bands that need to be processed can be minimized by setting the input band height according to the size of the input area. In the case of the above example, for example, in the intermediate buffer, if 60 lines' worth of data can be stored in the input area, by setting Bdh_in to 60 lines rather than 30 lines, the number of bands that need to be processed can be reduced.

In the case of the region division processing, image processing is performed sequentially per small region (processing unit) as described above. Accordingly, even if the number of small regions (processing units) changes from M to N between input and output, it does not affect the capacity of the intermediate buffer. For this reason, in the case where the input image data and the output image data have the same data structure, the capacity of the input area and the capacity of the output area can be assigned according to a change in one side of the pixel region, namely, from the input band height Bdh_in to the output band height Bdh_out. By doing so, for various image processing tasks in which the input pixel region size and the output pixel region size are different, it is only necessary to manage changes between input band height and output band height. Also, since it is only necessary to manage one-dimensional information indicated by "one side" with respect to changes in two-dimensional images, software that manages the intermediate buffer and controls the image input/output unit 152 can easily calculate values that are set for the DMAC and the image processing unit 150.

Figure 5A:
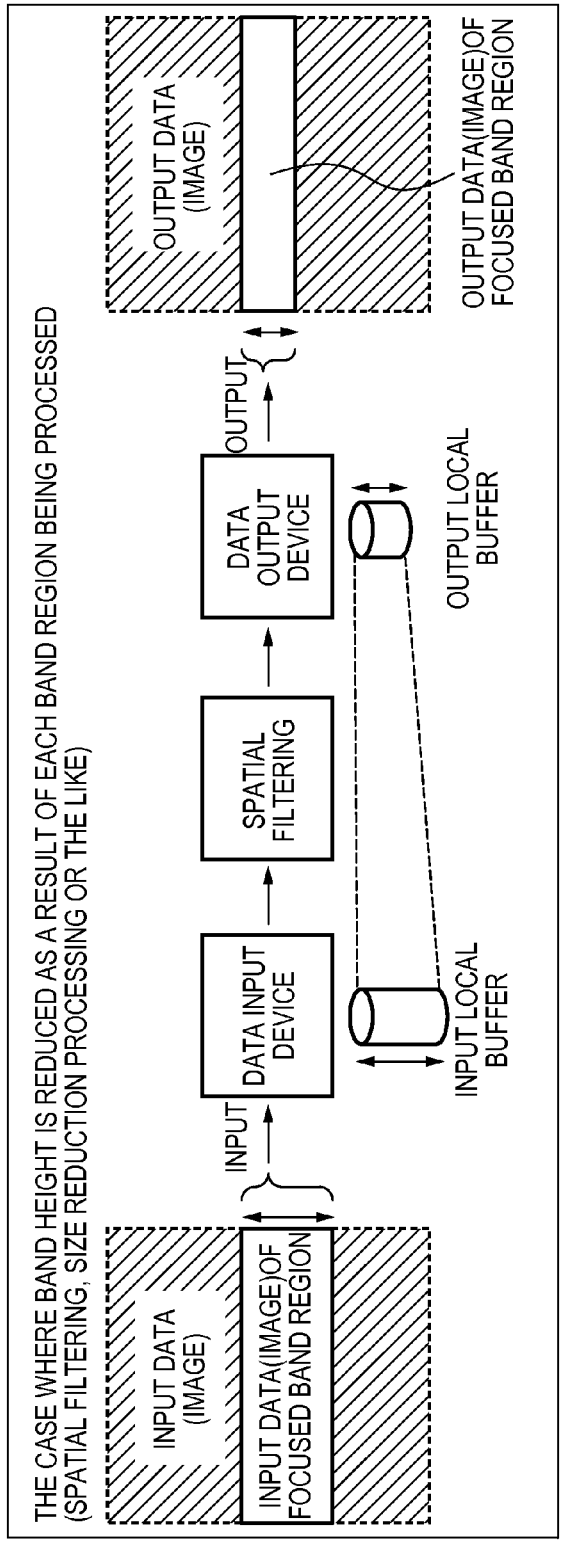
FIGS. 5A and 5B show an example of an operation of a conventional image processing apparatus.
Figure 5B:
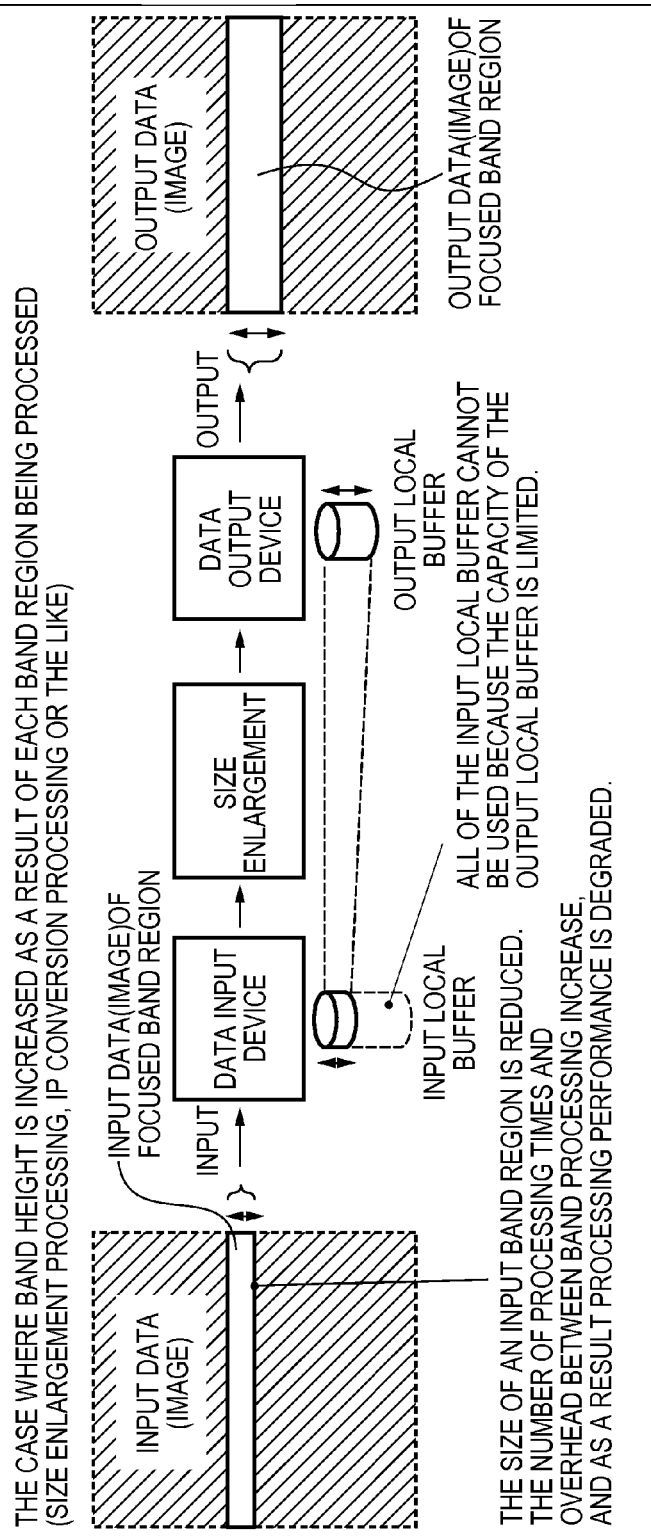

FIGS. 5A and 5B show a general prior art image processing apparatus. In the conventional image processing apparatus, a data input device for inputting image data and a data output device for outputting processed image data are configured as separate devices. Needless to say, the data input device and the data output device are each provided with a local buffer. It is assumed that, for example, there is an application that is frequently used in the case where the band height is reduced by spatial filtering or size reduction processing at the time of band processing (see FIG. 5A). In this case, when the input local buffer and the output local buffer are optimized, the image processing apparatus needs to be configured such that the input local buffer has a capacity larger than that of the output local buffer.

On the other hand, if it is necessary to perform size enlargement processing or high-quality IP conversion in some applications, the band height increases after processing (see FIG. 5B). In this case, the output band height is determined based on the output local buffer so that the output image data can be stored in the output local buffer. At this time, the value obtained by subtracting the increment of the band height from the output band height is set as the input band height. This is because if an input band having a height greater than that value is processed, the output band height will exceed the storage capacity of the output local buffer. In this case, because the input local buffer has a capacity larger than that of the output local buffer as a result of optimization described above, most part of the input local buffer remains unused. As described above, in the cases shown in FIGS. 5A and 5B, if the capacities of the local buffers are optimized for one of the cases, the local buffers cannot be used efficiently in the other case.

In the case of FIG. 5B described above, a single band region in the input image data is very small, and therefore the number of instances of band processing for processing single image data increases. In the case where image processing is performed sequentially per band processing, the CPU 102 needs to perform synchronization between band processing. For acquiring synchronization, the CPU 102 waits for an interruption notification, and thus wait time occurs as overhead each time synchronization is performed. This causes a concern that the processing speed of a single image processing task may be reduced as the utilization efficiency of the local buffers degrades.

Figure 6A:
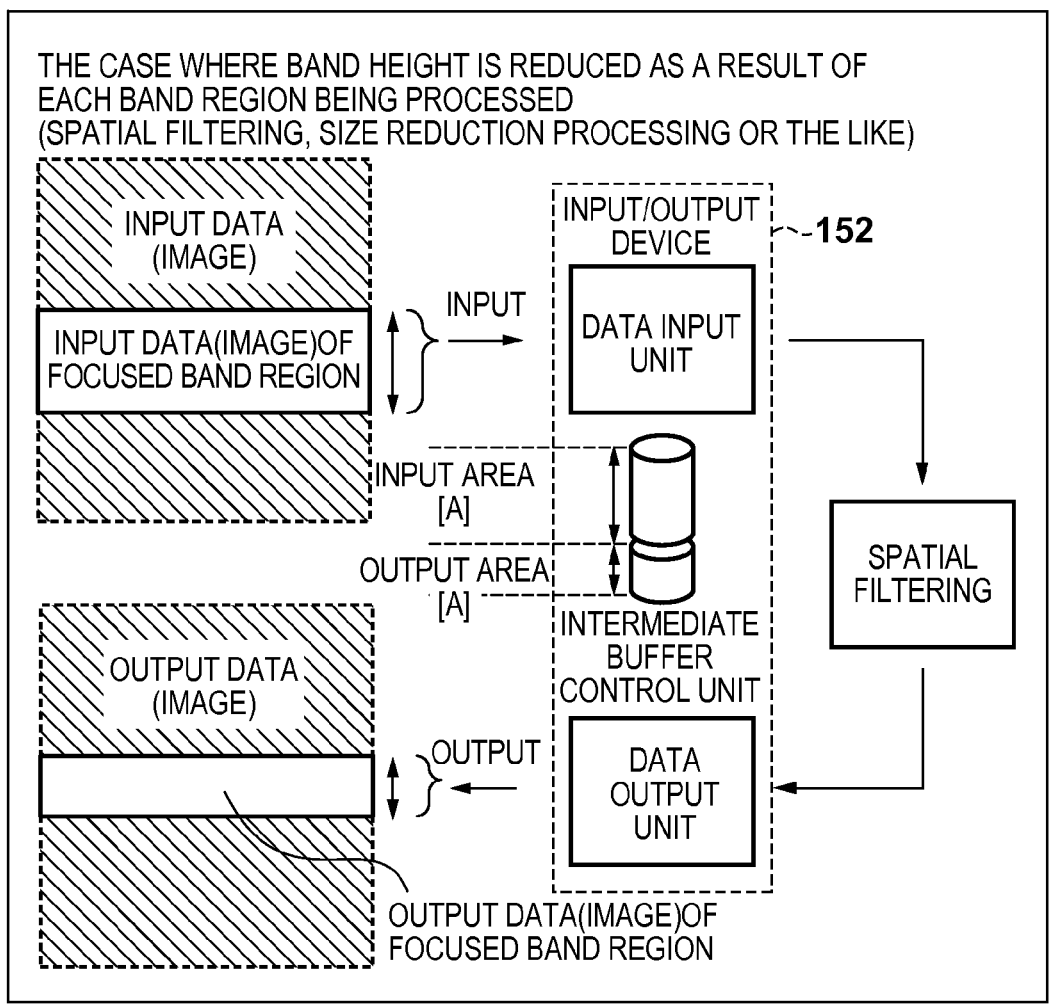
FIGS. 6A and 6B snow an example of an operation of the image processing apparatus of the present invention.
Figure 6B:
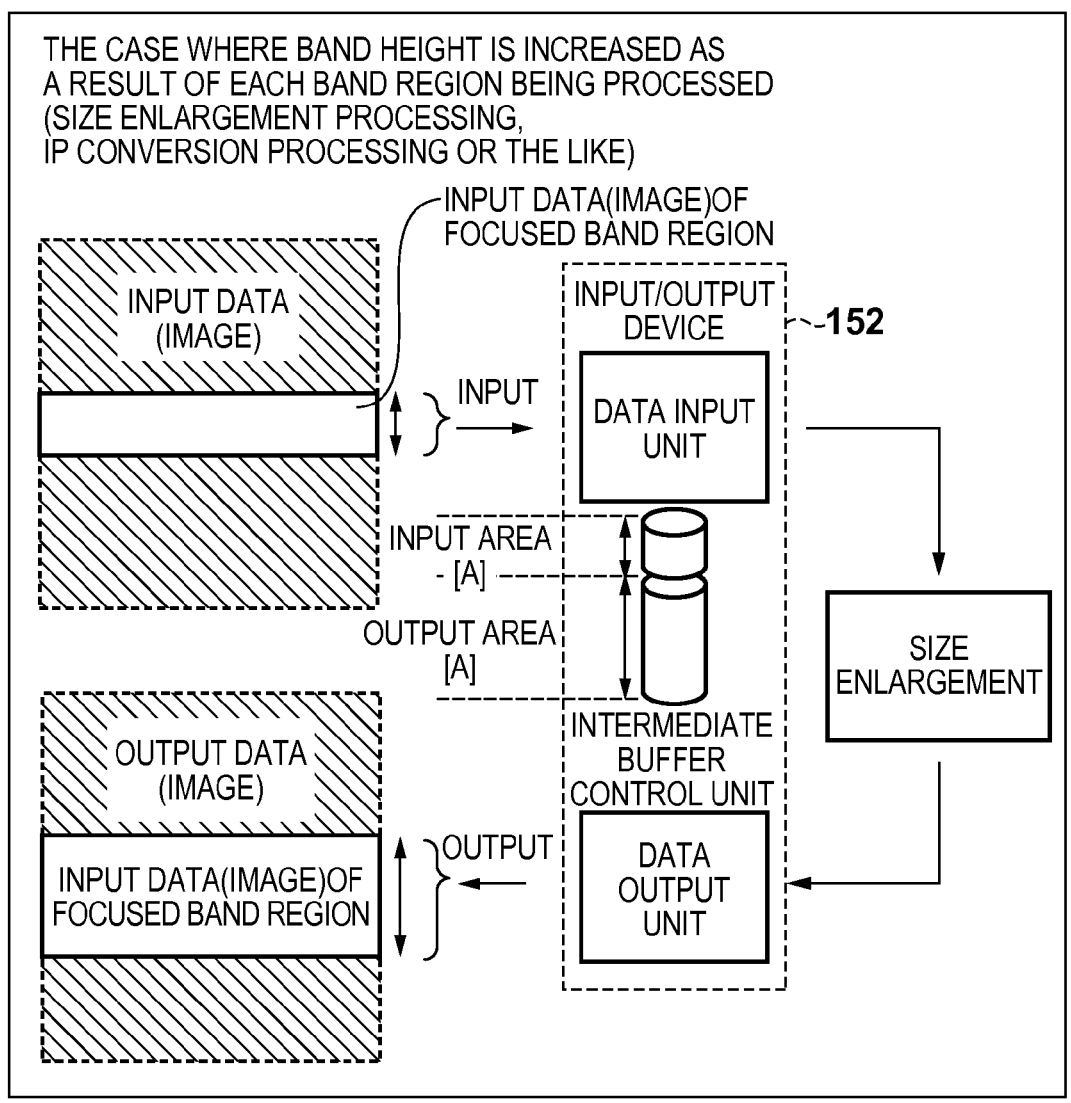

FIGS. 6A and 6B show another configuration and operation example of the image processing apparatus of the present invention. Note that FIG. 6A corresponds to the case of FIG. 5A, and FIG. 6B corresponds to the case of FIG. 5B. As shown in FIGS. 6A and 6B, an input/output device in which function units corresponding to the data input device and the data output device are integrated. Also, in this image processing apparatus, the input local buffer and the output local buffer described above are configured as a single intermediate buffer. With this configuration, if the type of image processing to be executed is changed, it is possible to sense the change in the relationship between the number of pixels of the pixel region input into the image processing and the number of pixels of the pixel region output from the image processing and change the allocation of the input area and the output area in the intermediate buffer. As a result, the occurrence of an unused area can be suppressed and the intermediate buffer can be used efficiently in both cases shown in FIGS. 6A and 6B. Also, in FIG. 6B, the band region height in the input image data can be increased as compared to that of FIG. 5B, and therefore the number of instances of band processing can be reduced. Accordingly, the processing speed of a single image processing task can be increased as compared to the conventional technique.

Figure 4B:
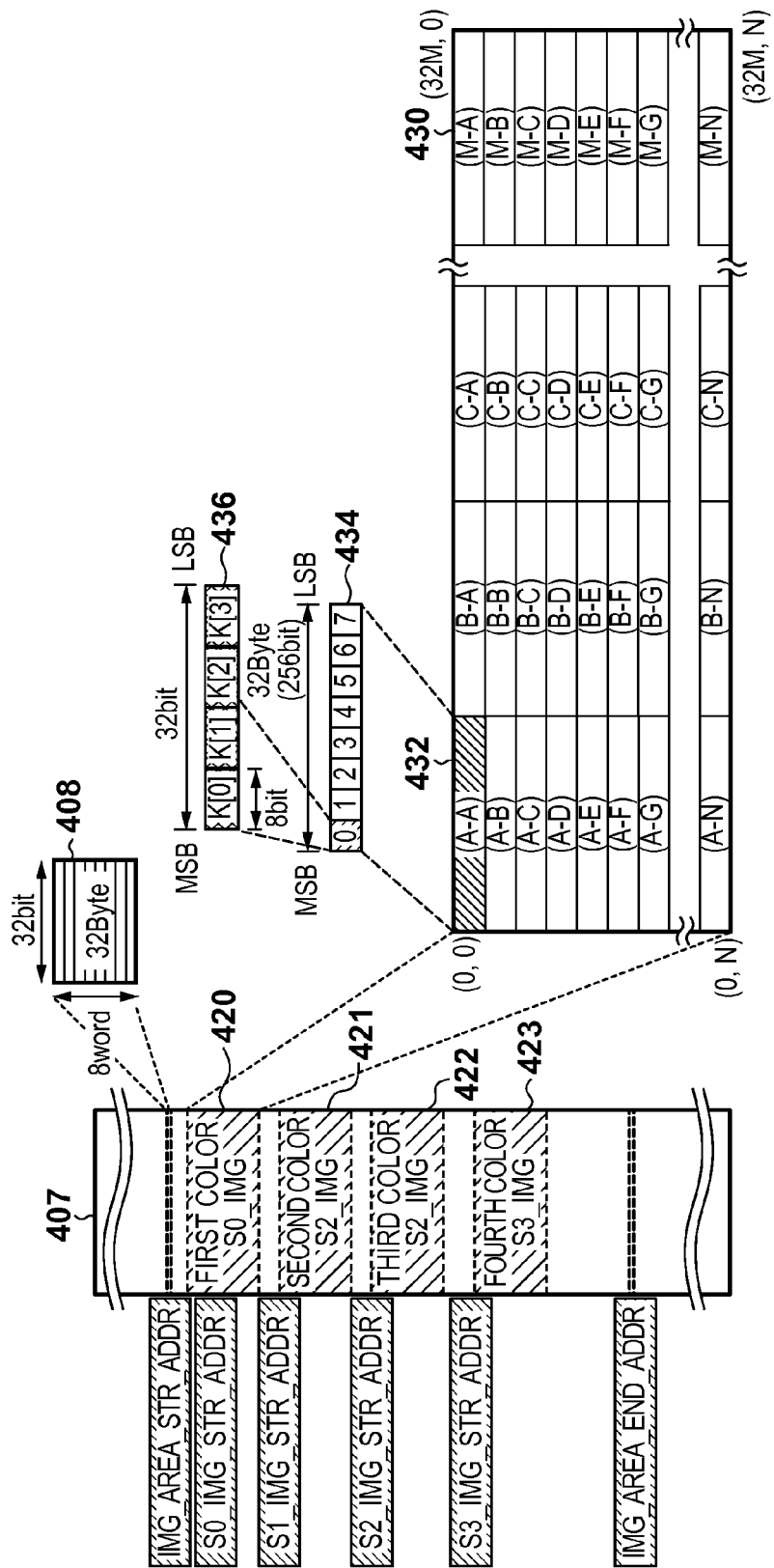

Next, a case will be described in which image data having a data structure that is different from the data structure described above is handled. For example, FIG. 4B shows an example of a structure of image data of frame sequential form. In the shown example, four types of image data from S0_IMG 420 to S3_IMG 423 are stored in the data area of the RAM 106 (DRAM). The four types of data are data obtained by, for example, subjecting an image read by the image reading unit 120 to color space conversion and density correction processing and then to conversion into a first color K (black), a second color M (magenta), a third color C (cyan) and a fourth color Y (yellow). The minimum unit of the capacity of each image data stored is set to 32 bits×8 words=32 bytes as indicated by 408, so that the image data can be read and written without reduction of DRAM performance. Needless to say, the data storage capacity for the data from S0_IMG 420 to S3_IMG 423 is an integer multiple of 32 bytes.

A data structure of image data will be described next in detail. Image data 430 is first color K (black) image data of the region S0_IMG 420 described above. A region 432 in the image data 430 is 32-byte unit data in which eight data pieces with a length of 32 bits indicated by 434 are packed. In each data piece with a length of 32 bits, a plurality of (four) K (black) color elements each having a length of 8 bits are packed as indicated by 436. In other words, the range indicated by the thick line 430 in the diagram represents image data whose number of pixels is 8×4×M×N. The same applies to the remaining second, third and fourth color image data.

In the case where the image data of frame sequential form described above is used as input image data in image processing, the four types of image data from the first color K (black) to the fourth color Y (yellow) are read from the RAM 106 per small region (processing unit). For example, with respect to image data corresponding to the small region 1, the top address of the DMAC 194 is set by sequentially switching it to the following four top addresses, and DMA transfer is executed four times.

Top address [first time]: S0_IMG_STR_ADDR in FIG. 4B
Top address [second time]: S1_IMG_STR_ADDR in FIG. 4B
Top address [third time]: S2_IMG_STR_ADDR in FIG. 4B
Top address [fourth time]: S3_IMG_STR_ADDR in FIG. 4B Then, all of the four types of image data that have been read are temporarily stored in the intermediate buffer 232. The image input unit 1521 reads four color elements located at predetermined positions (coordinates) of the four types of image data, and combines them into one and inputs it into the image processing execution unit 153 as a pixel value (C, M, Y, K) of dot sequential form. Also, the image input unit 1521 extracts four color elements from the processed dot sequential form pixel value (C, M, Y, K) and stores them in the respective four output image data regions in the output area. In this case, needless to say, DMA transfer needs to be performed four times when the output image data is written into the RAM 106.

Next, a configuration in which a SRAM is used as the intermediate buffer will be described with reference to FIG. 7. In this configuration, the DMAC 194 and the DMAC 196 are 3-channel DMACs and handle three different types of image data simultaneously. The input port 151 and the output port 154 of the image processing unit 150 are configured to have three ports so as to correspond to three channels. The image processing unit 150 is also capable of handling three different types of image data. In the configuration shown in FIG. 7, three input ports 711, 712 and 713 and three output ports 791, 792 and 793 are provided.

Among three ports, the input port [C] 713 is connected to an external input circuit 715 and the output port [C] 793 is connected to an external output circuit 795, and they have a function of bypassing the image input unit and the image output unit described above. The external input circuit 715 generates an input pixel value from input image data received via the input port [C] 713 and sends the generated value to the image processing execution unit 153. The external output circuit 795 generates output image data based on the output pixel value received from the image processing execution unit 153, and sends the generated data to the DMAC 196 via the output port [C] 793.

Image data input from the two remaining input ports (the input port [A] 711 and the input port [B] 712) is processed based on the function of the image input unit 1521 described above. Likewise, image data output to the two remaining output ports (the output port [A] 791 and the output port [B] 792) is generated based on the function of the image output unit 1523 described above.

Figure 7:
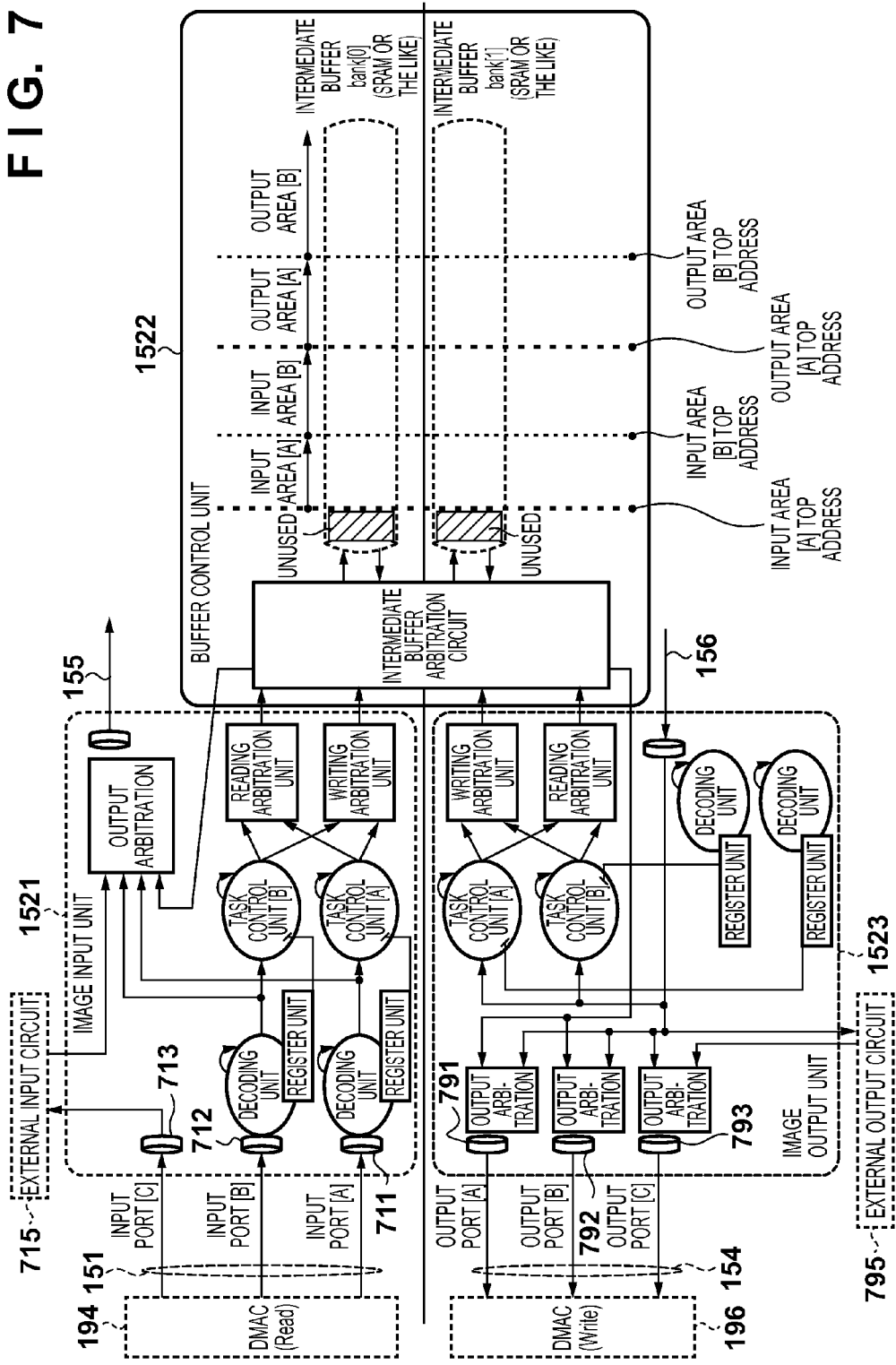
FIG. 7 shows an example of an image processing unit.

The configuration shown in FIG. 7 includes a 2-bank storage unit serving as an intermediate buffer. Due to the 2-bank configuration, up to two small regions (processing units) can be stored simultaneously. The intermediate buffer described above had a 1-bank configuration, and thus the image input unit 1521 performed reception of input image data and generation of pixel values from the input image data by using time division. Also, the image output unit 1523 performed generation of output image data from output pixel values and output of the output image data by using time division. The configuration shown in FIG. 7 includes a 2-bank storage unit, and therefore the input image data of the next small region (processing unit) can be received during generation of pixel values from the input image data. Also, generated output image data can be output during generation of output image data from output pixel values. In other words, the processing in the DMAC 194 and the image input unit 1521 and the processing in the DMAC 196 and the image output unit 1523 can be performed in parallel.

With the configuration shown in FIG. 7, two types of image data are simultaneously input and output, and therefore the input area and the output area of the intermediate buffer are further divided into two areas ([A] and [B]). In order to separate each area, the CPU 102 presets a top address for each area. Specifically, the CPU 102 sets top addresses for four areas, namely, an input area and an output area of the area [A] and an input area and an output area of the area [B]. In order to simplify processing, it is sufficient if one set of common top addresses is set in the 2-bank storage unit. This is because the input unit pixel region and the output unit pixel region are invariant and thus do not need to be changed for each bank. The capacities of the regions can be calculated based on two input band heights and two output band heights of two types of image data.

With the configuration shown in FIG. 7, the intermediate buffer is allocated to a plurality of types of image data handled simultaneously by the image processing unit 150, and therefore more flexible image processing can be performed. The above example described a method for handling two input image data and two output image data. However, even when, for example, two input images are formed into a single output image by using, for example, IP conversion or image combining, the data processing apparatus of the present invention can easily cope with the situation by allocating two input areas and one output area.

The foregoing has described an example in which a 2-bank storage unit is used, but if input and output are permitted to be performed by using time division as described above, it is possible to use a plurality of data in the 1-bank storage unit. For example, input top addresses and output top addresses respectively corresponding to a plurality of data can be set by using a large capacity storage unit.

In the above description, the unit for reading/writing image data was set to 32 bytes. However, the unit for reading/writing image data is not necessarily set to 32 bytes depending on the configuration of the RAM 106 in the image processing apparatus, the type of storage device (DRAM or the like) that implements the RAM 106, and the type of image processing executed. Even when the unit for reading/writing image data is changed, the image processing apparatus and the image processing method can be applied by simply changing the equation used to calculate the capacity of the intermediate buffer that stores image data.

Also, similarly, in the case where the 32-byte data structure of image data includes 4×2 pixels as indicated by 494 in FIG. 4A, it is only necessary to change the procedure for calculating the capacity of the intermediate buffer that store image data. In the above description, allocation of the capacity of the intermediate buffer was performed by using the input band height Bdh_in and the output band height Bdh_out. The image processing apparatus can cope with the data structure including 4×2 pixels by allocation of the capacity of the intermediate buffer based on the value obtained by dividing the input band height Bdh_in or the output band height Bdh_out by 2.

In the foregoing description, band processing was mainly discussed. However, the above-described image processing method can be applied to block (tile) processing, which is another region division technique. With block (tile) processing, image data is two-dimensionally divided into regions along the main scanning direction and the sub scanning direction. A pixel region obtained by two-dimensional region division corresponds to, for example, a small region (processing unit) described above. Sequential reading of small regions 1 to M is block (tile) processing. The major difference between the block (tile) processing of Japanese Patent Laid-Open No. 2010-087804 and the band processing of Japanese Patent Laid-Open No. 2006-139606 is the pixel scanning direction when generating pixel values from image data. In the block (tile) processing of Japanese Patent Laid-Open No. 2010-087804, scanning of pixels input into the image processing execution unit is performed along the main scanning direction. On the other hand, in the band processing of Japanese Patent Laid-Open No. 2006-139606, scanning of pixels input into the image processing execution unit is performed along the band height (sub scanning direction). However, in either case, the procedure for calculating the capacity of the intermediate buffer that stores image data is the same.

Also, if there is room in the storage capacity of the RAM 106 and it is unnecessary to reduce the capacity of the delay memory for local (neighborhood) image processing, it may be possible to, without performing band processing, store single image data 300 in the RAM 106 and perform image processing for each image. At this time, the capacity of the input area and the capacity of the output area of the intermediate buffer can be allocated with the size of image data in the sub scanning direction, rather than the band height.

According to the present invention, it is possible to provide a data processing apparatus, a data processing method and a storage medium that enable efficient utilization of a storage device that temporarily stores an input image and an output image under conditions where the number of input pixels and the number of output pixels vary.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-213380 filed on Sep. 28, 2011, which is hereby incorporated by reference herein in its entirety.

What is claimed is:

1. A data processing apparatus that obtains a pixel value of a pixel contained in an input pixel region of image data, inputs the pixel value to an image processor, obtains an image-processed pixel value from the image processor, and outputs the image-processed pixel value as a pixel value of a pixel in an output pixel region, the data processing apparatus comprising:
a storage unit configured to temporarily store data of the input pixel region and data of the output pixel region; and
a setting unit configured to set a size of an input area in the storage unit that stores the data of the input pixel region and a size of an output area in the storage unit that stores the data of the output pixel region based on a number of pixels in the input pixel region and a number of pixels in the output pixel region.

2. The data processing apparatus according to claim 1, wherein when the processing executed by the image processor is changed, the setting unit changes the size of the input area and the size of the output area based on a change in the number of pixels in the input pixel region and the number of pixels in the output pixel region.

3. The data processing apparatus according to claim 1, wherein the setting unit sets the size of the input area and the size of the output area based on a number of pixels on one side of the input pixel region and a number of pixels on one side of the output pixel region.

4. The data processing apparatus according to claim 3, wherein the input pixel region is data having pixel values of a part or all of a region obtained by dividing the image data in a main scanning direction or a sub scanning direction, and
wherein the one side of the input pixel region is a side of the region on which the image data was divided, and the one side of the output pixel region is a side of an image-processed pixel region corresponding to the divided side.

5. The data processing apparatus according to claim 1, wherein the data processing apparatus inputs each pixel value contained in one or more input pixel regions to the image processor, obtains image-processed pixel values from the image processor, and outputs each image-processed pixel value as one or more output pixel regions, and
wherein the setting unit sets the size of the input area and the size of the output area based on a number of the one or more input pixel regions and a number of one or more output pixel regions.

6. The data processing apparatus according to claim 5, wherein the setting unit sets a number of input areas corresponding to the number of input pixel regions and sets a number of output areas corresponding to the number of output pixel regions.

7. The data processing apparatus according to claim 1, wherein the setting unit sets the size of the input area and the size of the output area based on a ratio between the number of pixels of the input pixel region and the number of pixels of the output pixel region.

8. The data processing apparatus according to claim 1, wherein the setting unit sets the input area and the output area by setting a top address for the input area and the output area in the storage unit based on the size of the input area and the size of the output area in the storage unit.

9. The data processing apparatus according to claim 8, wherein the storage unit includes a plurality of banks, and
wherein the setting unit sets the top address that is common among the plurality of banks for the input area and the output area of the storage unit.

10. The data processing apparatus according to claim 1, wherein the input pixel region is a region containing one or more pixel values obtained by dividing the image data based on the size of the input area of the storage unit.

11. A data processing apparatus that processes a partial image obtained by dividing an input image held by a first storage unit into a plurality of strip-shaped regions in a first direction, the data processing apparatus comprising:
an image processor configured to carry out image processing in units of a partial image;
a second storage unit configured to store an input partial image that is input into the image processor in a first area and store an output partial image obtained as a result of the input partial image being subjected to image processing by the image processor in a second area; and
a setting unit configured to set a size of the first area and a size of the second area of the second storage unit based on a first number of pixels in the first direction of the input partial image and a second number of pixels in the first direction of the output partial image.

12. The data processing apparatus according to claim 11, wherein prior to the image processing performed by the image processor, the setting unit obtains the second number of pixels that is required as an output of the image processor, and obtains the first number of pixels based on content of the image processing from the second number of pixels.

13. The data processing apparatus according to claim 11, wherein the setting unit sets the first area and the second area each time one of a plurality of tasks related to image processing is performed.

14. The data processing apparatus according to claim 11, wherein the first storage unit is a DRAM,
wherein the second storage unit is a SRAM, and
wherein the data processing apparatus further comprises a first DMAC that executes transfer of data from the DRAM to the SRAM and a second DMAC that executes transfer of data from the SRAM to the DRAM.

15. The data processing apparatus according to claim 14, wherein the SRAM includes a plurality of banks, and
wherein the setting unit similarly allocates the first area and the second area for each of the plurality of banks.

16. A data processing method for a data processing apparatus that obtains a pixel value of a pixel contained in an input pixel region of image data, inputs the pixel value to an image processor, obtains an image-processed pixel value from the image processor, and outputs the image-processed pixel value as a pixel value of a pixel in an output pixel region, and that has a storage unit configured to temporarily store data of the input pixel region and data of the output pixel region, the method comprising:
with a setting unit, setting a size of an input area in the storage unit that stores data of the input pixel region and a size of an output area in the storage unit that stores data of the output pixel region based on a number of pixels in the input pixel region and a number of pixels in the output pixel region.

17. A non-transitory computer readable storage medium storing a program for causing a computer to function as units of a data processing apparatus that obtains a pixel value of a pixel contained in an input pixel region of image data, inputs the pixel value to an image processor, obtains an image-processed pixel value from the image processor, and outputs the image-processed pixel value as a pixel value of a pixel in an output pixel region, the units including:
- a storage unit configured to temporarily store data of the input pixel region and data of the output pixel region; and
- a setting unit configured to set a size of an input area in the storage unit that stores data of the input pixel region and a size of an output area in the storage unit that stores data of the output pixel region based on a number of pixels in the input pixel region and a number of pixels in the output pixel region.

* * * * *